(No Model.)
L. MILLER & A. E. ELLINWOOD.
WHEEL FOR HARVESTERS.
No. 276,450. Patented Apr. 24, 1883.
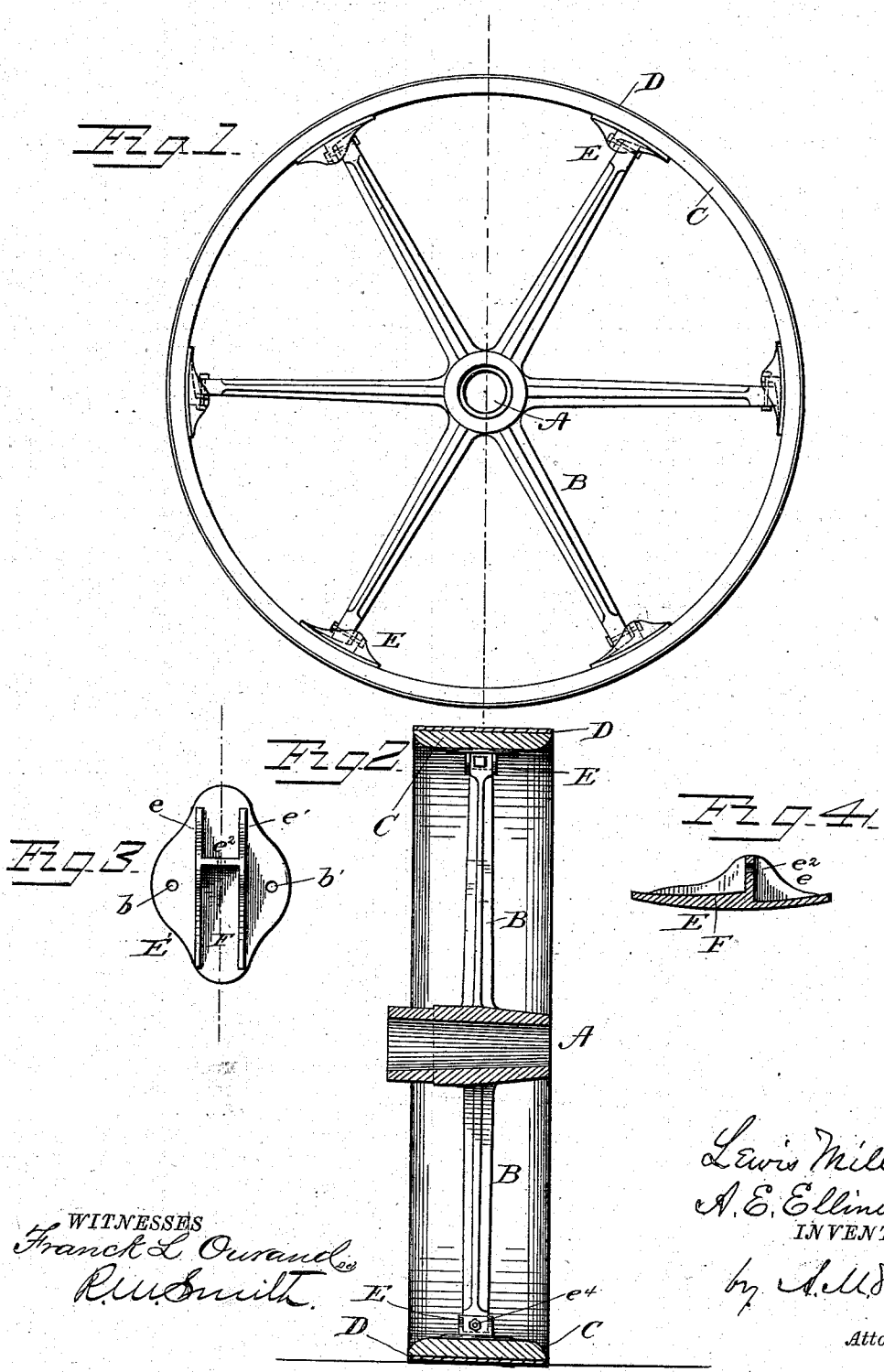
WITNESSES
Franck L. Durand
R. M. Smith
Lewis Miller
A. E. Ellinwood
INVENTORS,
by A. M. Smith
Attorney

UNITED STATES PATENT OFFICE.

LEWIS MILLER AND AUGUSTUS E. ELLINWOOD, OF AKRON, OHIO.

WHEEL FOR HARVESTERS.

SPECIFICATION forming part of Letters Patent No. 276,450, dated April 24, 1883.

Application filed September 16, 1882. (No model.)

*To all whom it may concern:*

Be it known that we, LEWIS MILLER and AUGUSTUS E. ELLINWOOD, both of Akron, county of Summit, and State of Ohio, have invented new and useful Improvements in Wheels for Harvesters, of which the following is a full, clear, and exact description, reference being had to the accompanying drawings, making part of this specification.

My invention relates to a novel construction of harvester-wheel, whereby the spokes radiating from the hub of said wheel are made detachable from the rim or fellies and made adjustable thereupon, so that when from any cause it becomes necessary to remove the hub and its radiating spokes from said rim or to tighten the attachment of the spokes to said rim it may be easily and quickly accomplished.

It consists in providing the rim of the wheel at equal intervals on its inner face with clips or socket-pieces, equal in number to the number of spokes, for receiving the outer ends of said spokes, said clips each being provided with longitudinal jaws or flanges, a transverse web or flange connecting said longitudinal flanges, an incline between said longitudinal flanges, extending from one end of said clip to the transverse web or flange, and a bolt or bolts passing through said web and the end of the spoke, which is beveled to conform to the incline between the longitudinal flanges, so that the ends of the spokes can be drawn up said inclines until they are firmly pressed against the inclined bases of the clips or socket-pieces, and at the same time held against lateral displacement by the longitudinal jaws or flanges, as hereinafter explained.

In the accompanying drawings, Figure 1 is a side elevation of my improved wheel. Fig. 2 represents a transverse section through the same. Fig. 3 is a plan view of the removable clip or socket-piece, through which the spokes are connected with the rim; and Fig. 4 represents a vertical longitudinal section through said clip or socket-piece.

In the accompanying drawings, A represents the hub of the wheel; B B, the spokes radiating therefrom, said hub and spokes being made in any usual or preferred manner and of any suitable material, but by preference made of metal and cast in one piece.

C is the rim or felly, and D the tire.

E E are the clips or socket-pieces interposed between the felly and the ends of the spokes B B, and in which the ends of the spokes rest and are secured.

The clip is constructed as follows: E' is the lower or base plate of the clip E, made to conform on its outer face to the shape of the inner side of the rim or felly C, and it is fastened to said felly by bolts passing through the holes $b\ b'$ and the felly, or in any suitable or preferred manner. The same bolts may be used for securing the tire to the rim.

Upon the base-plate E', Fig. 2, are formed or cast two jaws or flanges, $e\ e'$, and the distance between them is dependent upon the width or thickness of the end of the spoke which is intended to be secured between them. Between these flanges $e\ e'$, and connecting them, is a transverse web or flange, $e^2$, by preference placed a little beyond or to one side of the length of the clip, in order that the end of the spoke may rest in the center of said clip. The transverse web is also, by preference, made of the same height of the longitudinal flanges $e\ e'$, and is provided at or near its center with a hole, $e^3$, for the reception of a bolt, $e^4$, as shown in Fig. 4, said bolt also passing through the end of the spoke resting in the clip, thus securing the end of the spoke firmly to the transverse web $e^2$. Along the base of the clip E, between the longitudinal jaws or flanges, is an incline, F, extending from the edge of said clip and rising toward the transverse web $e^2$, the amount of slant being varied, as required. The spokes of the wheels are also beveled on their outer ends to conform to the inclination of the slanting floor or base F, so that they may ride up said incline. When the ends of all the spokes of the wheel have been placed in their receiving-clips or socket-pieces, the bolts $e^4$ are passed through the holes in the transverse web $e^2$, and also through the holes in the ends of the spokes B B, when, by screwing the nuts upon the bolts, the ends of the spokes are gradually drawn up the inclines F until they become tightly wedged thereupon, and thus held against further movement, while at the same time the longitudinal flanges prevent their lateral movement.

It will be seen that the hub and its radiating spokes can be easily and quickly detached from the rim and replaced; or when the spokes wear loose from continual jolting or from expansion of the felly, they can be easily adjusted and tightened in their sockets, thus obviating the necessity for the cutting of the tire, and enabling persons to substitute another rim or hub and spokes where from any cause they become injured or broken, or where it is desired to use another form of felly, hub, or spokes.

While the improvement in wheels above described is especially designed for harvesters and other agricultural machines, it is obvious that it may be applied in the construction of wheels for other purposes.

We do not limit ourselves to any particular form of clip or socket-piece, or to the combination with them of square-ended spokes, or to the particular means named for securing the spokes in said clips, as other devices in common use will answer the purpose equally as well; but,

Having now described our invention, what we claim as new, and desire to secure by Letters Patent, is—

1. The combination, with the rim of a ground or traction wheel, of removable clips or socket-pieces for receiving the ends of the spokes of said wheel, said clips being provided each with a longitudinally-inclined floor or base upon which the spokes ride with a rotary movement relatively to the rim, for their adjustment, and means for securing the ends of the spokes in said clips, substantially as described.

2. A ground or traction wheel provided with removable clips or socket-pieces having each longitudinal flanges and a longitudinally-inclined floor or base, in combination with a transverse web provided with a hole for the reception of a bolt or fastening for drawing the end of the spoke up said incline and securing it, substantially as and for the purpose set forth.

3. The combination with a clip or socket-piece secured to the rim of a wheel, and having longitudinal flanges, a transverse flange and a longitudinally-inclined floor or base, of a spoke beveled on its outer end to conform to and ride up said inclined floor, and secured to the transverse flange, substantially as described.

4. The hub and spokes, cast in one piece separate from the rim, in combination with a rim provided with clips or socket-pieces for the reception of the ends of the spokes, said clips being each provided with longitudinal flanges, a transverse web or flange, and a longitudinally-inclined floor or base, and means for securing said spokes adjustably to said transverse webs, substantially as described.

In testimony whereof we have hereunto set our hands this 5th day of September, A. D. 1882.

LEWIS MILLER.
A. E. ELLINWOOD.

Witnesses:
  N. N. LEOHUER,
  JOHN HAFER.